(12) United States Patent
Wroolie et al.

(10) Patent No.: US 9,295,187 B2
(45) Date of Patent: Mar. 29, 2016

(54) DUAL BLADE PARALLEL GARDEN HOE

(71) Applicants: Kelly Wroolie, Brainerd, MN (US);
William Wroolie, Brainerd, MN (US)

(72) Inventors: Kelly Wroolie, Brainerd, MN (US);
William Wroolie, Brainerd, MN (US)

(73) Assignee: Kelly Gene Wroolie, Brainerd, MN (US)

( * ) Notice: Subject to any disclaimer, the term of this patent is extended or adjusted under 35 U.S.C. 154(b) by 50 days.

(21) Appl. No.: 14/534,935

(22) Filed: Nov. 6, 2014

(65) Prior Publication Data

US 2015/0060095 A1    Mar. 5, 2015

Related U.S. Application Data

(63) Continuation-in-part of application No. 13/692,015, filed on Dec. 3, 2012, now abandoned.

(51) Int. Cl.
*A01B 1/10* (2006.01)
*A01B 1/22* (2006.01)

(52) U.S. Cl.
CPC .... *A01B 1/10* (2013.01); *A01B 1/22* (2013.01)

(58) Field of Classification Search
CPC ........... A01D 80/02; A01D 7/06; A01D 7/00; A01C 5/02; A01B 1/14; A01B 1/22; A01B 1/10
See application file for complete search history.

(56) References Cited

U.S. PATENT DOCUMENTS

| 12,760 | A | * | 4/1855 | Chatfield | 30/209 |
| 645,702 | A | * | 3/1900 | Arlaud | 172/378 |
| 719,723 | A | * | 2/1903 | Beebe | 172/373 |
| 743,981 | A | * | 11/1903 | Hagen | 172/375 |
| 1,612,894 | A | * | 1/1927 | Thompson | 56/400.2 |
| 6,073,702 | A | * | 6/2000 | Petruzzelli | 172/378 |
| 6,131,381 | A | * | 10/2000 | Milbury | 56/400.17 |

\* cited by examiner

*Primary Examiner* — Jamie L McGowan

(57) ABSTRACT

The dual blade garden hoe device includes an elongated handle having a shaft mounted at the working end thereof. A pair of blades is secured onto the shaft and disposed at a variable pitch. The blades can be positioned at various locations along the length of the shaft to create different widths between the blades. The blades comprise a cutting portion that create a pair of parallel troughs when dragged through soil. When the blades are in contact with the ground, each blade creates a separate and parallel trough, thereby reducing the time and effort needed to make a systematic gardens design or a plurality of farming rows. Additionally, the blades can move in a back and forth motion, depending upon the direction of travel, and laterally depending on obstructions in the soil.

1 Claim, 3 Drawing Sheets

DUAL BLADE PARALLEL GARDEN HOE

CROSS REFERENCE TO RELATED APPLICATION

This application is a continuation in part of U.S. application Ser. No. 14/534,935 filed Nov. 6, 2014. This application also claims the benefit of U.S. application Ser. No. 13/692, 015 filed Dec. 3, 2012, Ser. No. 13/297,165 filed on Nov. 2, 2011, and U.S. Provisional Application No. 61/502,134 filed on Jun. 28, 2011, each of which is incorporated herein by reference.

FIELD OF THE INVENTION

The present invention relates to the field of gardening and farming tools. More specifically, the present invention pertains to an improved handheld tool that provides a variable pitch and dual-headed garden hoe for parallel farming row creation with a single pass on various types of terrain.

BACKGROUND OF THE INVENTION

While gardening implements have become more technologically advanced, there is still a need for manual gardening devices. For instance, the common garden hoe is still one of the most widely used manual gardening devices. Garden hoes generally chop weeds and soil, and work the surface of the soil and cut weed roots below the surface. Standard garden hoes, however, permit work accomplished at a rather slow rate of speed. Mainly, this is due to a single blade being employed to work the soil in a single direction, requiring movement around the plants by the user to operate the hoe in various directions.

Farming rows are commonly used to create parallel lines of a particular harvest, with a trough separating each row to allow room for growth and for access to each row by a farmer, harvester, or mechanism in service therefor. The use of organized rows also maximizes the use of a given area of land, allowing the most crops to be harvested at once, if desired. Garden areas are usually built such that there is an aligned order to the way plants or vegetables are planted. Gardeners prefer to have even rows to walk through an adequate space to till their gardens. This is true even if the area is not in a rectangular or square shape or where circular rows or rows in an arc may be preferable. Having even rows improves the appearance of the garden, allows the plants to flourish, and is the most efficient way to seed a patch of earth. Planting in rows allows for a systematic way of getting the most planting space from a particular area. This is particularly true when the land is relatively small in size. The space between rows is dependent on the specific crop and the space required by the gardener or farmer resulting from an expected growth size of plants in each row.

In the past, a variety of tools have been used for the purpose of tilling and creating organized rows on a farm or garden. Unfortunately, prior garden hoe devices available do not allow for multiple rows to be plowed manually at one time. A user must work one row at a time and spend additional time aligning consecutive rows, which often includes use of additional tools, such as stakes and string, and/or various methods, to make sure the rows are parallel with each other. Such procedures result in increased time and effort producing a uniform plot of land for gardening, which can result in loss of productivity.

SUMMARY OF THE INVENTION

The instant invention comprises a device for tilling soil manually with a handheld implement that comprises a plurality of aligned garden hoe blades. In one embodiment, the present invention comprises aligned garden hoe blades that are disposed on a working end of an elongated shaft, which allow multiple troughs and multiple locations to be tilled simultaneously and in a parallel configuration even if the rows are nonlinear. The implements are loosely and removable, secured along a common rail and aligned in parallel with one another, allowing one user to increase productivity by producing multiple aligned rows within a garden at one time. The loose attachment of the blades and the oblong holes hole thereon not only permits them to wiggle or move during tilling, but also prevents attachment pins from rusting to the shaft of the hoe. As will be described in further detail herein, there are many additional features of the present invention.

BRIEF DESCRIPTIONS OF THE DRAWINGS

Understanding of the present invention will be facilitated by consideration of the following detailed description of the embodiments of the present invention taken in conjunction with the accompanying drawing, in which like numerals refer to like parts, and wherein.

DETAILED DESCRIPTION OF THE INVENTION

Figure 1:
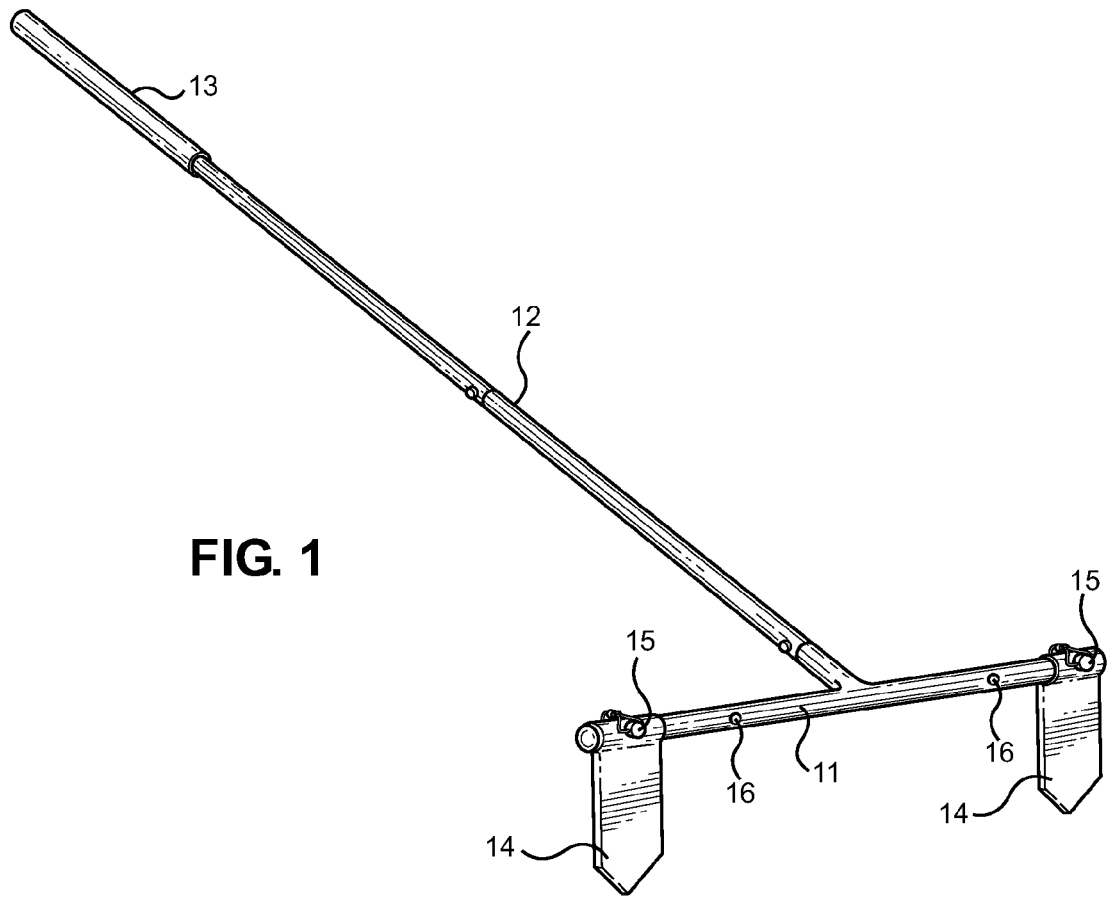
FIG. 1 shows a perspective view of the present invention.

References are made herein to the attached drawings. Like reference numerals are used throughout the drawings to depict like or similar elements of the dual blade parallel garden hoe. For the purposes of presenting a brief and clear description of the present invention, the preferred embodiment will be discussed as used for creating a plurality of parallel garden rows in a simultaneous manner and using a single pass with a handheld implement. The figures are intended for representative purposes only and should not be considered to be limiting in any respect.

Figure 2:
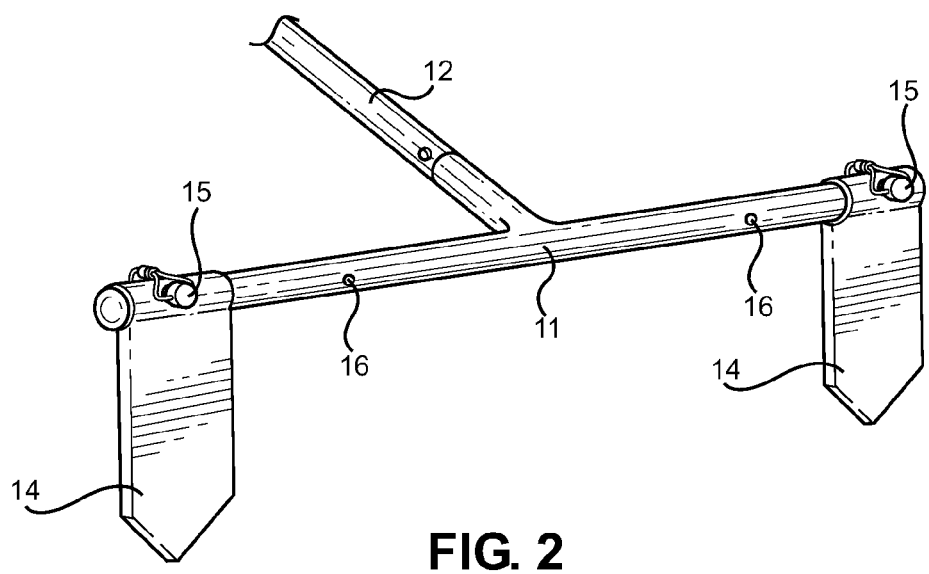
FIG. 2 shows a close up view of the working end of the present invention in a starting position.

Referring now to FIGS. 1 and 2, there is shown a perspective view of the present invention and a close up view of the working end of the present invention.

The dual blade parallel garden hoe of the present invention comprises an elongated handle 12 having a distal end and a working end. The working end comprises a shaft 11 that extends perpendicularly to the handle 12, such that the handle 12 and the shaft 11 form a T-junction. In the illustrated embodiments, the handle 12 and the shaft 11 comprise circular cross sections with a uniform diameter over its length. The handle 12 is an elongated member that may further comprise a gripping surface 13 covering around its distal end in order for the user to have a more secure grip thereof. The grip may comprise a high friction material or a soft, comfortable material to improve user comfort after prolonged use of the device. The handle itself is adjustable in length to accommodate different sized users. In the illustrated embodiment, the handle can be separated into multiple sections. Each section may be attached and detached via a spring loaded button that can be pressed through an aperture disposed at one or both ends of each section. Alternatively, the handle may be of one-piece construction from handle through the working end.

The shaft 11 comprises a pair of blades 14 attached thereto. Each blade 14 comprises a loosely fitted rounded sheath with an oversized opening for sliding over and along the shaft 11. The blade 14 further comprises a cutting portion that extend downward from the rounded sheath. The cutting portion is triangular or pointed at an end thereof in order to break through the ground. Additionally, the cutting portion has a wide profile to allow soil to be pulled or pushed as necessary during the tilling operation.

The blades 14 are parallel to one another in order for the user to create two aligned troughs through the ground. The blades 14 are secured to the shaft 11 via metal pins 15 or other fastener. The round sheath portion of each of the blades 14 and the shaft 11 includes oblong hole and pinholes such that fasteners may be placed there through, wherein the fasteners comprise pins 15 that can be easily removed without use of tools. The pinholes 16 on the shaft 11 are circular in shape, and are spaced apart at various locations along the shaft 11 to allow placement of blades 14 at different distances from one another, depending on the user application and preferences. For instance, the blades 14 can be brought close together when the user desires closely spaced parallel lines, and the blades 14 can be brought further apart when the user desires widely spaced parallel lines. The hole on the blades 14 are oblong in shape, thereby allowing the blades 14 to tilt slightly relatively to the shaft 11 in a back and forth movement. Side to side movement is caused by the loosely fitted rounded sheath 18 having a larger diameter than the shaft 11.

Figure 3:
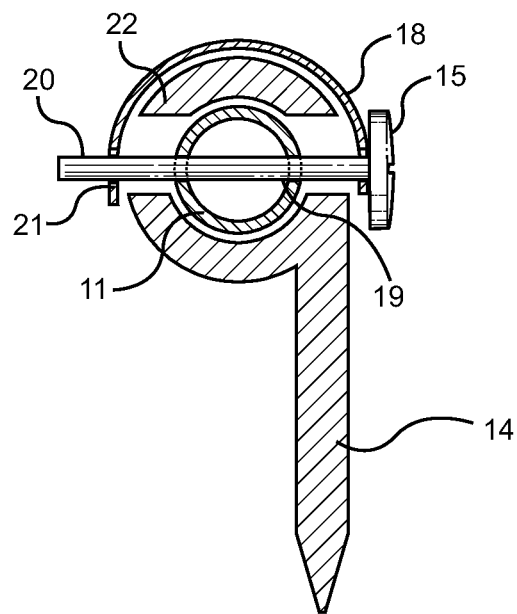
FIG. 3 shows a side planar view of the working end of the present invention.
Figure 4:
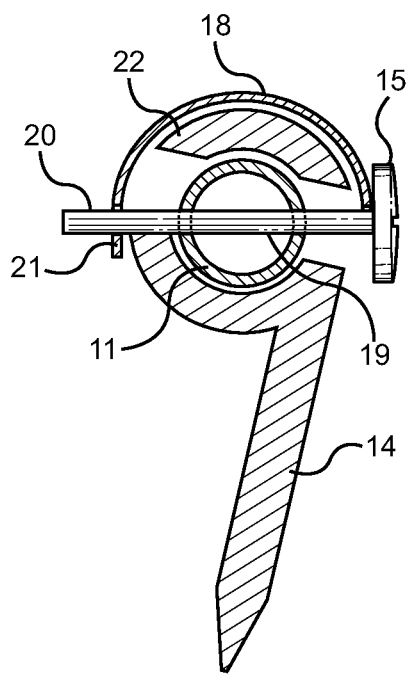
FIG. 4 shows a side planar view of the working end of the present invention in a backward position.
Figure 5:
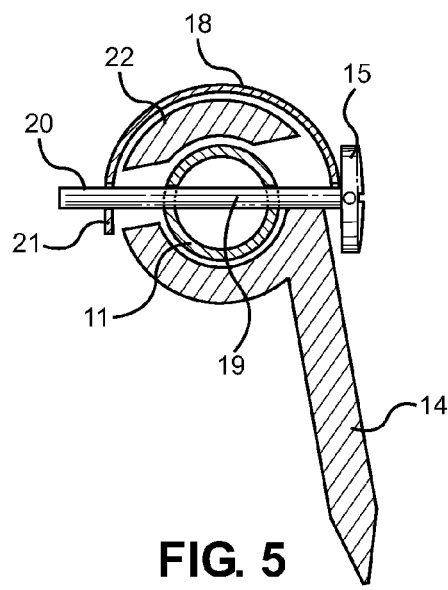
FIG. 5 shows a side planar view of the working end of the present invention in a forward position.

Referring now to FIG. 3 through 5, there are shown close up side planar views of the working end of the present invention. The rounded sheath portion 22 of the blade 14 encircles the shaft 11 loosely and is held in place via a fastener. In the illustrated embodiment, the fastener comprises a pin 15 having an elongated shaft 19 and a curved member 18. The shaft 19 and the curved member 18 are connected to the head of the pin 15. In one embodiment, the curved member 18 is attached to the head of the pin 15. Alternatively, the shaft 19 and the curved member 18 are attached to the head of the pin 15 so that the pin 15 is unitary in structure. The shaft 19 is inserted through the circular pinholes disposed on the shaft 11 and the oblong hole disposed on the rounded sheath portion 22 of the blade 14. The shaft 19 extends through the substantial midpoint of the shaft 11. The shaft 19 is dimensioned so that its distal end 20 extends beyond the rounded sheath portion 22. The curved member 18 is disposed over the top exterior portion of the rounded sheath portion 22. It is contemplated that the curved member 18 lies substantially flat against the rounded sheath portion 22 and comprises an opening or a gap near the distal end 21 thereof. The curved member 18 can be slightly flexed so as to allow the distal end 20 of the shaft 19 to be inserted through the opening on the distal end 21 of the curved member 18. In this way, the distal ends 20, 21 of the shaft 19 and the curved member 18 intersect and prevent the pin 15 from dislodging.

The rounded sheath portion 22 of the blade 14 encircles the shaft 11 loosely. Accordingly, the rounded sheath portion 22 of the blade 14 comprises a diameter that is greater than the diameter of the shaft 11. Additionally, the hole on the rounded sheath portion 22 of the blade 14 are oblong, while the pinholes on the shaft 11 are substantially circular. The oblong hole on the rounded sheath portion 22 allows the blades 14 to wiggle or move in a backward or a forward motion as they move through the soil. The oblong hole create a channel in which the pin 15 can be guided back and forth. The diameter of the head of the pin 15 is larger than the oblong hole on the rounded sheath portion 22 of the blade. In this way, the head of the pin 15 does not pass through the hole. Loosely attached blades are more shock absorbent than rigid blades, and are thus better able to adjust to rocks and debris within the soil. In this way, the present invention gives a user the ability to create uniform parallel garden rows easily.

In a starting position, the cutting portion of the blade 14 is positioned so that it is substantially parallel with the vertical axis, as shown in FIG. 3.

In a backward position, the cutting portion of the blade 14 is biased toward the handle or the back of the user, as shown in FIG. 4. In a forward position the cutting portion of the blade 14 is biased away from the handle or the front of the user, as shown in FIG. 5. In forward and backward positions, the rounded sheath portion 22 is tilted so that the shaft 19 of the pin 15 contacts the periphery of the pinholes on the shaft and oblong hole on the rounded sheath portion 22.

Figure 6:
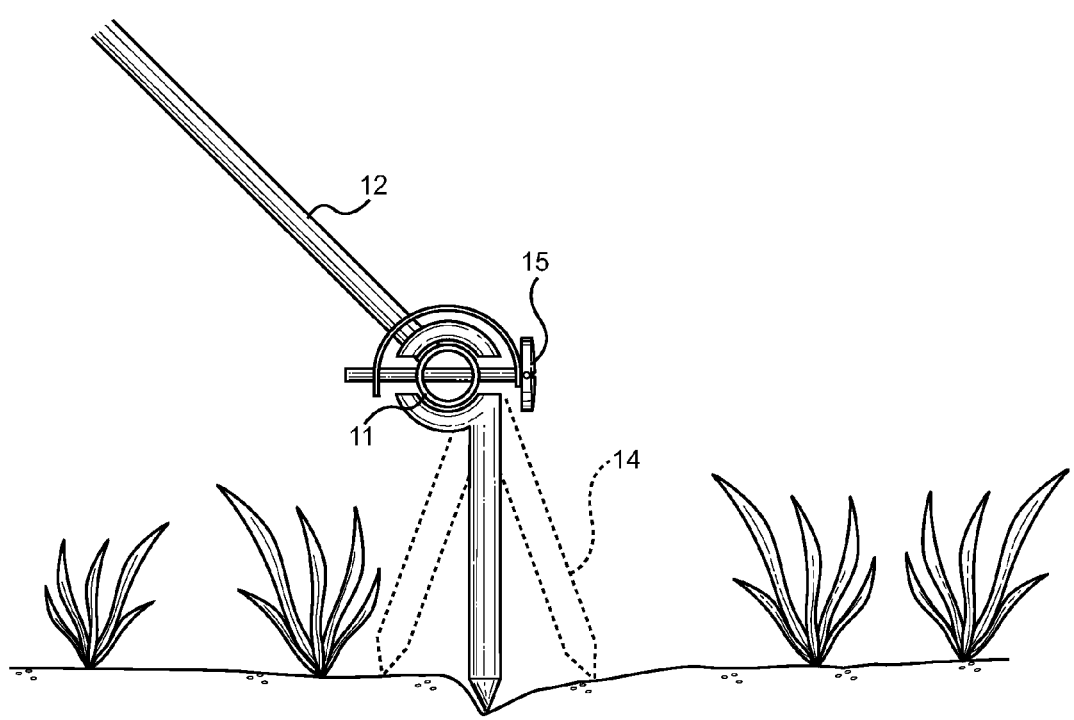
FIG. 6 shows a side planar view of the present invention in use.

Referring now to FIG. 6, there is shown a side planar view of the present invention in use. As the blade 14 is dragged through the soil, the blade 14 shifts forward or backward and side to side. This feature gives the device better shock absorption than most gardening tools. Better shock absorption by the tool will result in less risk of injury by users because harsh vibrations do not travel along the device up to a user's hands. For example, when a user hits a large rock buried beneath the soil surface, they might experience only a small jostle as opposed to the uncomfortable jarring sensation experienced by conventional gardening tool users.

Additionally, the loose attachment of the rounded sheath portion to the shaft permits the pins to slide forward and backward, preventing them from rusting to the rounded sheath portion and fixing the blade permanently to the shaft working end. However, the pin is prevented from dislodging because the distal ends of the shaft and the curved member intersect. When the device is not in use, the pins may be easily detached so as to remove the blades from the shaft. The device can be hung on a wall with the blades loosely hanging downward therefrom, or leaned alongside a wall with the blades tilted towards the wall. This easily modifiable storage state makes it easy and fast to store the blades, without having to disassemble the entire device or store blades or pin in an alternate location from the shaft. Importantly, the ability to tilt the blades from a place of heavy traffic reduces the risk that someone will run into the blade and injure himself or herself.

In use, the individual places the garden hoe device on top of a patch of soil. The user pushes or pulls the device in order to loosen the soil to make room to plant seeds. The spacing between the blades of the device is determined prior to use. The pins may be removed and the blades can be moved along the perpendicular shaft of the device to align with another pinhole, whereby the pins may be replaced to secure the place blade in position. The device can further be flipped over and the shaft 11 can be used to cover seeds a layer of top soil, without the need to bend over, kneel, or use another device.

It is therefore submitted that the instant invention has been shown and described in what is considered to be the most practical and preferred embodiments. It is recognized, however, that departures may be made within the scope of the invention and that obvious modifications will occur to a person skilled in the art.

With respect to the above descriptions then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A garden hoe device, comprising:
an elongated handle with a distal end and a working end having a shaft perpendicularly attached thereto;
said shaft having four parallel aligned pinholes, two on each side of the handle, allowing for blade placement as desired;
at least one blade, on each side of the shaft, having a rounded loose fitting sheath portion with a single oblong hole going through the entire sheath to accept a pin, and a cutting portion extending therefrom;
wherein said rounded loose fitting sheath portion of said at least one blade on each side is slid on the shaft thereby aligning the oblong sheath hole with the pinholes on the shaft to allow for pin insertion in a selected pinhole, thereby determining row spacing;
said pin inserted into the oblong hole of said loosely fitted rounded sheath portion and pinholes of the shaft portion allow the cutting portion of the blade on each side movement in a lateral and forward and backward directions.

* * * * *